(No Model.)
H. M. NEWINGTON.
KNOB ATTACHMENT.
No. 524,861.  Patented Aug. 21, 1894.
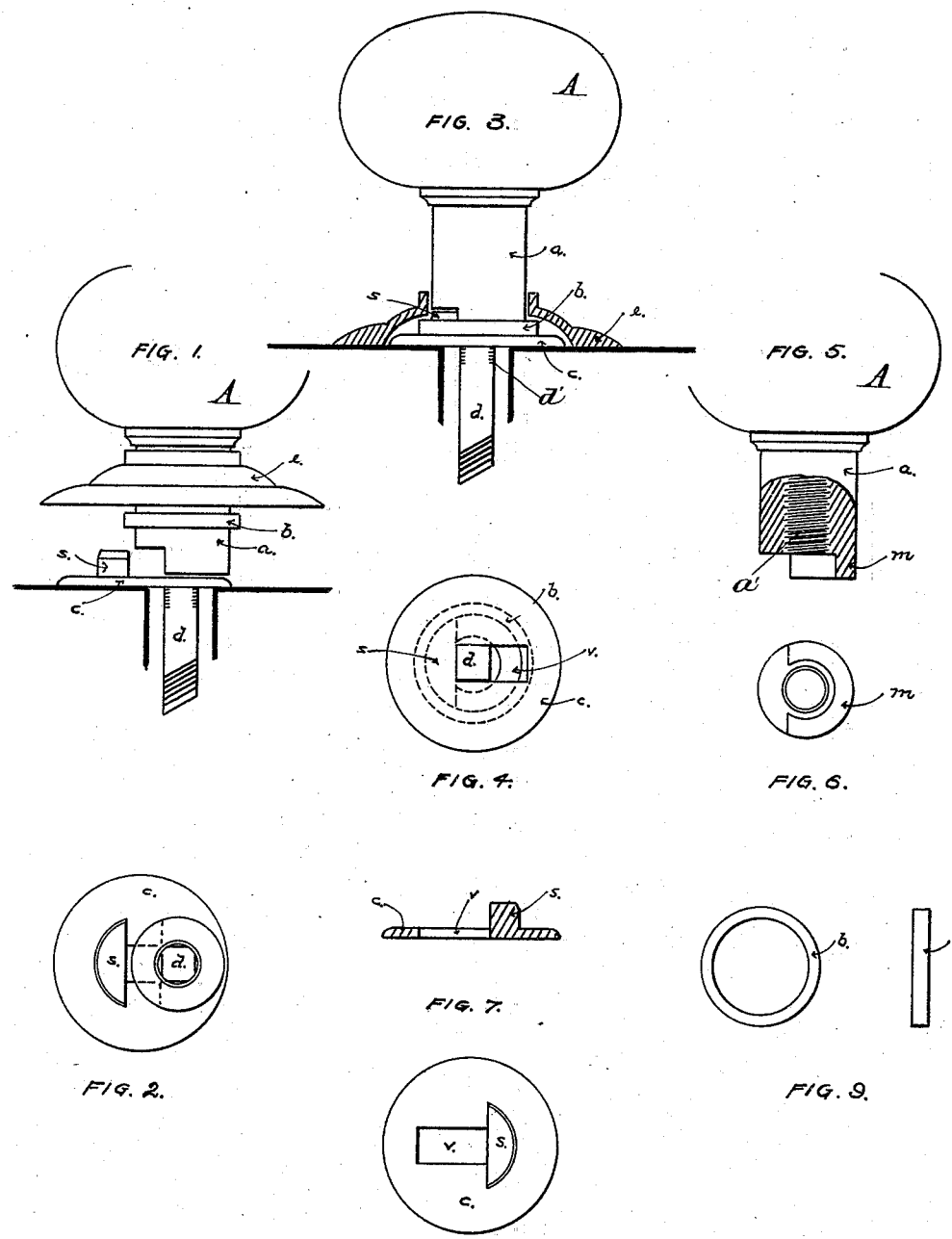
WITNESSES.  INVENTOR.

UNITED STATES PATENT OFFICE.

HARRY M. NEWINGTON, OF NEW YORK, N. Y.

KNOB ATTACHMENT.

SPECIFICATION forming part of Letters Patent No. 524,861, dated August 21, 1894.

Application filed August 7, 1893. Serial No. 482,527. (No model.)

*To all whom it may concern:*

Be it known that I, HARRY M. NEWINGTON, a resident of the city, county, and State of New York, have invented certain new and useful Improvements in Knob Attachments, of which the following is a specification.

My invention relates to means for attaching knobs to spindles, and it has for its object to permit the ready attachment of the knob to the spindle in such manner as to make a tight fit between the knob and the door, while at the same time combining simplicity of construction, ease of adjustment, positive action, strength, durability and cheapness of manufacture.

The invention consists in a knob having a shank provided with a projection, a washer also having a projection to engage the first mentioned projection, means for holding said projections together and a spindle to enter said shank and arranged to be turned by said washer.

The invention also consists in the details of improvement and the combinations of parts that will be more fully hereinafter set forth and then pointed out in the claims.

Reference is to be had to the accompanying drawings forming part hereof, wherein—

Figure 1 is a side view of my improvement in the partly adjusted position. Fig. 2 is a detail of the washer, spindle and shank. Fig. 3 is a partly sectional side view of my improvement complete. Fig. 4 is a detail view of the under side of the washer and spindle. Fig. 5 is a partly sectional side view of the knob and shank. Fig. 6 is an end view of the shank. Fig. 7 is a cross section of the washer. Fig. 8 is a detail face view of the washer, and Fig. 9 is a detail view of the collar or ring hereinafter explained.

In the accompanying drawings, in which similar letters of reference indicate corresponding parts in the several views, the letter A indicates a knob, which may be of suitable construction, and $a$ is a shank extending from said knob, and suitably connected therewith. The shank $a$ has a screw threaded bore $a'$ leading inwardly from its end, and on the end of said shank is a projection $m$.

$d$ is a spindle having threads $d'$ at one end, which spindle may operate the mechanism of any suitable lock. The spindle is polygonal or squared, at least at one part, and when squared at its threaded end the threads are located on its edges.

$c$ is a washer adapted to lie against the side of a door or a plate thereon and through which washer the spindle $d$ passes. The washer $c$ has an elongated opening $v$ for the spindle, the sides of which opening correspond to the sides of the spindle $d$, so that said washer will turn the spindle, the spindle $d$ and opening $v$ in the washer being shown provided with square sides and walls (see Fig. 4). The opening $v$ is larger in one direction than the thickness of the spindle $d$ so that the washer can slide on said spindle. The washer $c$ is provided with a projection $s$; the projection $m$ on the shank $a$ is adapted to engage the projection $s$ on washer $c$ so as to turn the latter and thus turn the spindle $d$. Said projections $m$ and $s$ are each preferably in the form of a segment of a circle, and arranged so that the chords of the segment will abut, while the peripheries of the segments together form a circle as in Fig. 6.

$b$, is a collar or ring that fits on the shank $a$, and is arranged to surround the projections $m$ and $s$, and thus clamp them together so that the shank $a$ can turn the washer and thus transmit motion to the spindle.

$e$ is a rose or escutcheon that fits over the washer $c$ and clamp or collar $b$, and said rose may be suitably secured to the door so as to hold the clamp or collar $b$ in place.

In assembling the parts the washer $c$ is first placed on the spindle $d$, and moved to one side through its slot or opening $v$. so that the projection $s$ will be out of line with the shank $a$ of the knob, (see Fig. 1.) The clamp or collar $b$ and rose $e$ are then slipped on the shank $a$ and the latter is screwed on the spindle $d$, until the projection approaches or rests on the washer $c$. The washer $c$ is then pushed back along the spindle $d$, until the projections $m$ and $s$ meet whereupon the clamp $b$ is pressed down over said projections and the rose $e$ is fastened against the door to hold said clamp or collar in position. The parts will now be properly fastened together as clearly shown in Fig. 3. As the knob A is next turned the projection $m$ will bear on the projection $s$ and turn the washer which latter will thereupon turn the spindle. To remove the knob from the spindle $d$, the rose or escutcheon $e$ is first slipped along the shank, the clamp or collar is then removed from the projections $m$ and $s$, then washer $c$ is pushed back to remove the projection $s$ from the projection $m$ and the shank $a$ unscrewed from the spindle.

Should the washer not be located on the spindle in such position that the projections $m$ and $s$ meet to enable the shank to be screwed sufficiently far on the spindle it is only necessary to remove the washer, turn it around the desired distance and replace it on the spindle. By this means the shank can screw on the spindle to a quarter of a turn whereby a tight fit between the parts is produced, so that the spindle will not have longitudinal movement when the knob is pulled. The knob on the opposite end of the spindle (not shown) may be made similarly to that above described, or of any preferred construction.

It will be observed that there are no screws, pins or loose parts to become detached and that there are few parts not liable to get out of order.

Having now described my invention, what I claim is—

1. The combination of a knob having a shank, a projection on said shank, and a spindle to enter said shank, with a washer having an elongated opening to receive said spindle said opening being arranged to allow the washer to have lateral motion on the spindle, a projection on said washer to engage the projection on the shank, and means for holding said projections together, substantially as described.

2. The combination of a knob having a shank and a spindle to enter said shank with a washer to receive said spindle, said washer having an elongated opening to permit lateral movement of said washer, projections between said washer and said shank, and a clamp or ring surrounding said projections to hold them together, and prevent lateral movement of the washer on the spindle, substantially as described.

3. The combination of a knob having a threaded shank, a projection on said shank and a threaded spindle to enter said shank, with a washer having an opening to receive said spindle, said opening being arranged to permit said washer to have lateral movement on said spindle, a projection on said washer and a clamp or collar fitting on said shank and arranged to surround said projections to hold them together, substantially as described.

4. The combination of a knob having a shank, a projection at the end of said shank in the form of the segment of a circle, and a spindle to enter said shank, with a washer to receive said spindle, a projection on said washer also in the form of the segment of a circle to engage the projection on the shank, and a clamp or collar arranged to fit around said projections to hold them together, substantially as described.

5. The combination of a knob having a shank provided with a threaded bore, and a projection at its end, a threaded spindle to enter the bore in the shank, a washer to receive said spindle and arranged to turn the latter, said washer having a projection to engage the projection on the shank, a clamp or collar surrounding said projection, and a rose or escutcheon arranged to fit over said shank, and to hold said clamp or collar in position, substantially as described.

HARRY M. NEWINGTON.

Witnesses:
HENRY NEWINGTON,
M. NEWINGTON GOODWIN.